Patented Sept. 5, 1939

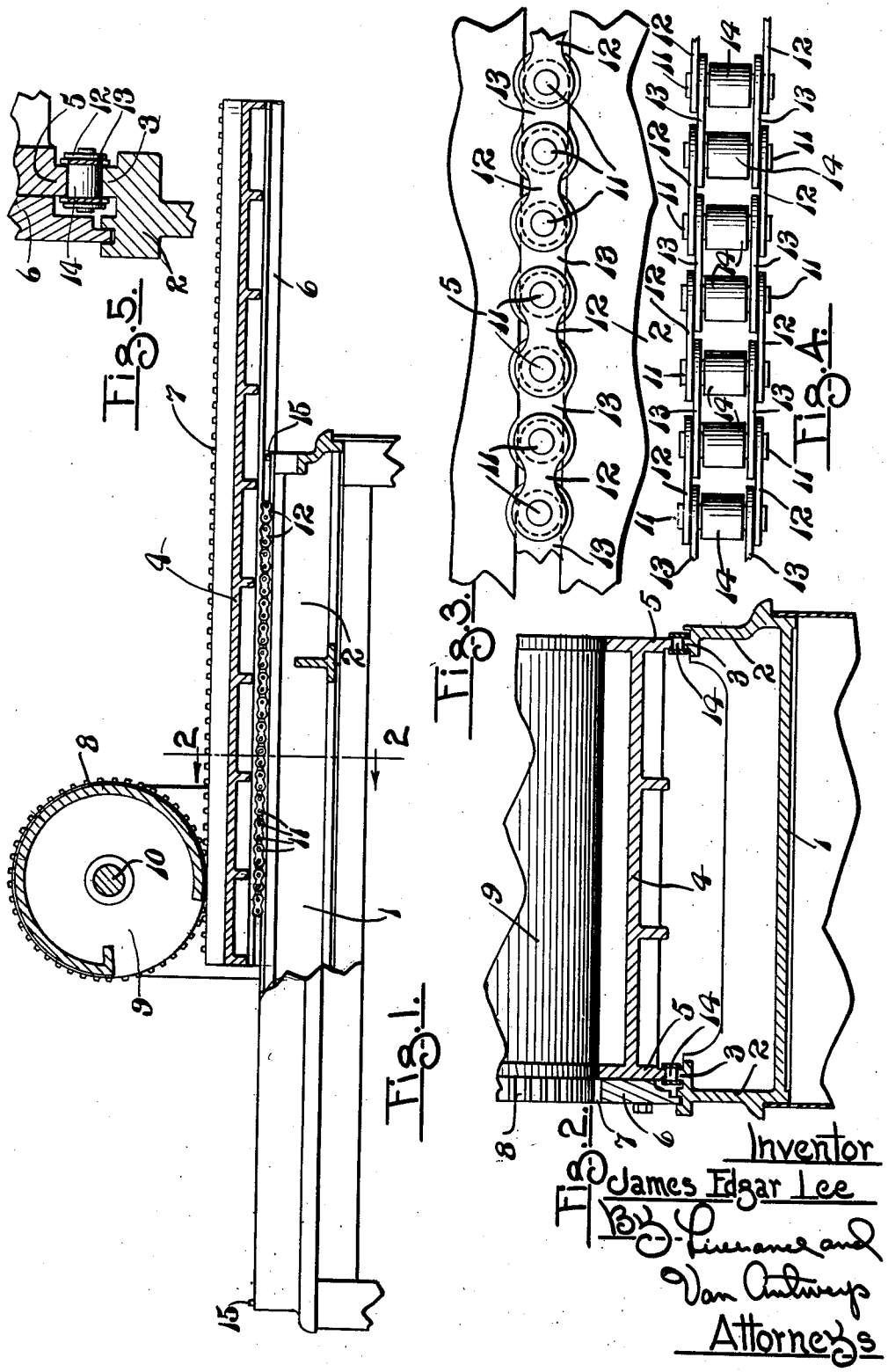

2,171,854

UNITED STATES PATENT OFFICE 2,171,854

ROLLER CHAIN BEARING

James Edgar Lee, Grand Haven, Mich., assignor to The Challenge Machinery Company, Grand Haven, Mich., a corporation of Michigan Application October 26, 1936, Serial No. 107,661

2 Claims. (Cl. 308—6)

This invention relates to an anti-friction bearing for beds of printing presses.

This invention is particularly useful in providing an anti-friction roller bearing for the beds of printing presses such as proof presses in which the bed on which the type rests reciprocates although the roller bearing embodying this invention can be used in other structures.

It is common practice to provide an anti-friction bearing for the reciprocating bed of a printing press and printing presses have also been built with roller bearings for that purpose. The object of the present invention is to improve the type of roller bearing and at the same time reduce the expense. This invention conceives the use of a common roller chain such as is used in connection with sprockets for transmitting power and in so mounting the chain by the especially constructed tracks on the bed and frame respectively so that the rollers of the chain will serve as roller bearings for the bed and will traverse the tracks and will be held in spaced apart relation between links of the chain. The chain is so mounted on the structure that the rollers may slip slightly in their travels and therefore will not pause at the respective ends of the reciprocated movements in exactly the same places relative to the tracks and consequently will not wear grooves either in the tracks or rollers.

The invention provides various new and useful features of construction and arrangement as hereafter more fully described and particularly pointed out in the claims, reference being had to the accompanying drawing, in which Fig. 1 is a longitudinal sectional elevation showing the essential parts of the mechanism in a printing press to which my invention is applied.

Fig. 2 is a transverse vertical section substantially on the plane of line 2—2 of Fig. 1, looking in the direction indicated by the arrows.

Fig. 3 is a fragmentary enlarged side elevation illustrating the roller chain anti-friction bearing between the movable bed and its support below.

Fig. 4 is a fragmentary plan view of the anti-friction roller chain bearing used, and Fig. 5 is an enlarged fragmentary transverse section of the roller chain and track.

Like reference characters refer to like parts in the different figures of the drawing.

The supporting table of the printing press is indicated at 1, being carried at its corners by any suitable posts or the like. From the side edges of the table 1 sides 2 extend vertically, each of which at its upper edge is provided with a horizontal track 3, providing two spaced apart parallel tracks. The bed 4 of the printing press, upon which the assembled type within a chase is carried, at its side edges has downwardly extending flanges 5 which terminate in narrowed track portions of substantially the same width as the tracks 3 previously described and directly over said tracks. An elongated bar 6 is bolted to one side of the bed and at its upper edge is cut with a plurality of teeth making a rack 7 which is in meshing engagement with the gear 8 secured to the end of a rotatably mounted cylinder 9 which is turned by rotating a shaft 10 on which it is mounted.

The lower edge of the bar 6 extends into and traverses a groove in the table 1 which groove is parallel to the tracks 3 and this bar 6, traveling in its groove, holds the bed against lateral movement relative to the table.

Upon the tracks 3 and between the same and the lower edges of the sides 5 of the bed suitable lengths of roller chain are positioned. The chain has spaced apart pintles 11 which are connected as shown in Fig. 4 by links 12 and 13 and rollers 14 are mounted on the pintles between the ends of the links.

Stop pins 15 project upwardly from each lower track 3 at its respective ends to prevent the roller chain running off the end of the track and the distance between the stop pins on each track is slightly greater than the combined length of the chain and length of its normal travel. The links 12 and 13 are wider than the diameter of the rollers and the rollers are slightly longer than the width of the tracks 3 and 5 so that the links overlap the vertical edges of the tracks and hold the chain against lateral displacement.

In operation the bed 4 is reciprocated above the table 1 and rides upon the rollers 14 of the chains which are interposed between the tracks 5 on the bed and the tracks 3 on the table and the bed is guided laterally by the lower edge of the bar 6 riding in its groove in the table 1. The rollers 14 of an ordinary commercial roller sprocket chain are accurately made as to diameter and are of hardened steel and serve admirably for the purpose of roller bearings. Likewise this standard type of roller chain has its links wider than the diameter of its rollers so that they will overlap the track and retain the chain in place.

In actual operation the chains will slip somewhat longitudinally of the tracks during reciprocating movements of the bed which is desirable because it avoids the rollers constantly stopping in the same place on the tracks at the end of each reciprocation and eliminates the grooving of the track which occurs under such conditions.

The manufacture of the table and bed with the tracks to receive the chain between them and the utilization of the standard commercial roller sprocket chain not only produces a very desirable and practical non-friction bearing structure but also greatly reduces cost thereof. This standard roller chain, which is made by chain manufacturers equipped to produce it in large quantities, can be purchased at a cost greatly less than the average printing machine manufacturer could make a roller bearing and the track structure to receive it, which is made by the printing machine manufacturer, is exceedingly simple and cheap to build.

The invention is defined in the appended claims and is to be considered comprehensive of all forms of structure coming within their scope.

I claim:

1. An anti-friction bearing structure comprising two tracks in juxtaposed position and movable longitudinally relative to each other, a roller chain located with its rollers interposed between said tracks, a member in fixed relation to one of said tracks having a slot parallel thereto and a guide member in fixed relation to the other of said tracks having a portion traversably located in said slot.

2. An anti-friction bearing structure comprising two tracks in juxtaposed relation and longitudinally movable relative to each other, a plurality of spaced apart rollers interposed between said tracks, links connected to the respective rollers, said links embracing each of said tracks, a member in fixed relation to one of said tracks having a slot parallel thereto, and a guide member in fixed relation to the other of said tracks having a portion traversably located in said slot.

JAMES EDGAR LEE.